United States Patent
Turner et al.

(10) Patent No.: US 12,447,689 B2
(45) Date of Patent: Oct. 21, 2025

(54) METHOD FOR MANUFACTURING LOW MODULUS ARTICLES

(71) Applicant: Lung Biotechnology PBC, Silver Spring, MD (US)

(72) Inventors: Peter Scott Turner, Venice, CA (US); Seth Astle, Berkeley, CA (US); Gregory Hurst, Bedford, NH (US); Kyle Wardlow, Somerville, MA (US)

(73) Assignee: Lung Biotechnology PBC, Silver Spring, MD (US)

( * ) Notice: Subject to any disclaimer, the term of this patent is extended or adjusted under 35 U.S.C. 154(b) by 164 days.

(21) Appl. No.: 18/503,336

(22) Filed: Nov. 7, 2023

(65) Prior Publication Data

US 2024/0149532 A1     May 9, 2024

Related U.S. Application Data

(60) Provisional application No. 63/444,151, filed on Feb. 8, 2023, provisional application No. 63/423,731, filed on Nov. 8, 2022.

(51) Int. Cl.
*B29C 64/40* (2017.01)
*B29C 64/124* (2017.01)
*B33Y 10/00* (2015.01)
*B33Y 80/00* (2015.01)
*B29L 31/00* (2006.01)

(52) U.S. Cl.
CPC ............ *B29C 64/40* (2017.08); *B29C 64/124* (2017.08); *B33Y 10/00* (2014.12); *B33Y 80/00* (2014.12); *B29K 2995/0077* (2013.01); *B29L 2031/753* (2013.01)

(58) Field of Classification Search
None
See application file for complete search history.

(56) References Cited

U.S. PATENT DOCUMENTS

2019/0263070 A1 *  8/2019  Barth ..................... B33Y 40/20
2021/0187863 A1 *  6/2021  Moine .............. B29D 11/00009

FOREIGN PATENT DOCUMENTS

EP            2 645 157 A2 *   2/2013

* cited by examiner

*Primary Examiner* — Mohammad M Ameen
(74) *Attorney, Agent, or Firm* — Foley & Lardner LLP

(57) ABSTRACT

A method of manufacturing a three-dimensional (3D) article includes operating a print engine to fabricate a composite structure including the 3D article coupled to a support structure, removing the composite structure from the fluid tank, and peeling the inside surface of the sheath away from the outer surface of the article, peeling progressively breaks the plurality of strands. The support structure includes a conformal sheath having an inside surface that follows the outer surface of the 3D article with a gap between the inside surface of the sheath and the outer surface of the article, and a plurality of strands that span the gap and individually have opposed ends that are coupled to the inside surface of the sheath and the outer surface of the article to maintain the gap, the gap filled with the photocurable liquid ink.

24 Claims, 16 Drawing Sheets

METHOD FOR MANUFACTURING LOW MODULUS ARTICLES

CROSS-REFERENCE TO RELATED APPLICATIONS

The present application claims priority to US Provisional Application Nos. 63/423,731 filed on Nov. 8, 2022, and 63/444,151, filed on Feb. 8, 2023, which are incorporated herein by reference in their entireties.

FIELD OF THE INVENTION

The present disclosure concerns an apparatus and method for fabrication of solid three dimensional (3D) articles of manufacture from radiation curable (photocurable) inks. More particularly, the present disclosure concerns a method of supporting 3D articles that have a low modulus and are fragile.

BACKGROUND

Three dimensional (3D) printers are in rapidly increasing use. One class of 3D printers includes stereolithography printers having a general principle of operation including the selective curing and hardening of radiation curable (photocurable) liquid inks. A typical stereolithography system includes a liquid tank holding the photocurable ink, a movement mechanism coupled to a support surface, and a controllable light engine. The stereolithography system forms a three dimensional (3D) article of manufacture by selectively curing layers of the photocurable ink over the support surface.

One particular challenge is in forming 3D articles from fragile, low modulus materials such as hydrogels. One possible application is the printing of artificial tissue or bodily implants. Damage can occur during fabrication, post-processing, shipping and handling of the 3D article.

SUMMARY

An aspect of the disclosure is a method of manufacturing a three-dimensional (3D) article having an outer surface using a print engine having a fluid tank, a moveable build surface coupled to a movement mechanism, and a light engine. The method includes filling the fluid tank with a photocurable liquid ink, positioning the moveable build surface within the photocurable ink proximate to a build plane, operating the movement mechanism and the light engine to fabricate a composite structure including the 3D article coupled to a support structure, removing the composite structure from the fluid tank, and removing the sheath from the 3D article by peeling the inside surface of the sheath away from the outer surface of the article; peeling progressively breaks the plurality of strands. The support structure includes a conformal sheath having an inside surface that follows the outer surface of the 3D article with a gap between the inside surface of the sheath and the outer surface of the article, and a plurality of strands that span the gap and individually have opposed ends that are coupled to the inside surface of the sheath and the outer surface of the article to maintain the gap, the gap filled with the photocurable liquid ink.

This method has an advantage for a very low modulus and delicate 3D article such an article printed from a low modulus hydrogel material. The combination of the conformal sheath and the plurality of strands effectively supports the 3D article during manufacture and removal from the liquid tank. The peeling removal of the sheath from the article is easily and quickly performed manually. The low modulus strands, as they are broken, do not damage the delicate 3D article.

In one implementation the photocurable liquid ink contains water, a photopolymer, and a catalyst. The ink can include more than 30 weight percent water or more than 40 weight percent water. The photocurable liquid ink hardens in response to exposure to ultraviolet (UV), violet, and/or blue radiation.

In another implementation the photocurable liquid ink is a hydrogel formulation including, inter alia, water, natural or synthetic polymers, and a catalyst. Natural polymers for hydrogel preparation can include, inter alia, hyaluronic acid, chitosan, heparin, alginate, and fibrin.

In yet another implementation, the formed composite structure has an elastic modulus of less than five million pascals (MPa), less than two million pascals (MPa), less than one million pascals (MPa) or within a range of 50 to 500 thousand pascals (KPa).

In a further implementation, the gap can have a thickness of less than two millimeters (mm) or less than one millimeter (mm).

In a yet further implementation, the plurality of strands can include at least 25 strand, at least 50 strands, at least 100 strands, or at least 200 strands.

In another implementation, the plurality of strands can individually include a location of weakness within the gap at which they preferentially break when peeling the inside surface of the sheath away from the outer surface of the article.

In yet another implementation, the 3D article is one of a contact lens, an artificial bodily tissue construct, and a soft implant.

In a further implementation, the sheath can be left in place during post-processing and/or during transport. Post-processing can include cleaning, curing, coating, or otherwise treating the 3D article after fabrication. The sheath can be left on and then removed after transport to a site at which it is used.

DETAILED DESCRIPTION OF THE PREFERRED EMBODIMENTS

Figure 1:
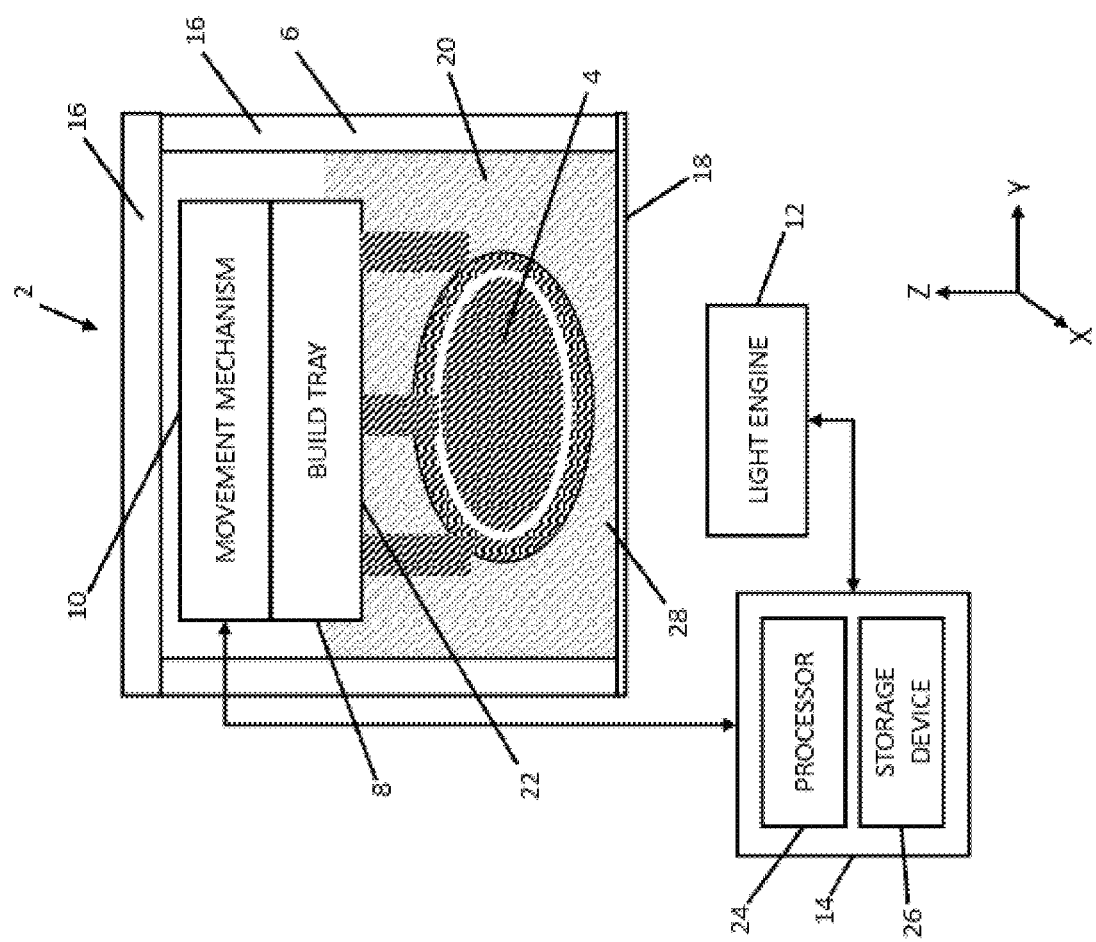
FIG. 1 is a schematic diagram of an embodiment of a three-dimensional (3D) printing system for manufacturing a 3D article.

Unless the context indicates otherwise, it is specifically intended that the various features described herein can be used in any combination. Moreover, the disclosure also contemplates that in some embodiments, any feature or combination of features set forth herein can be excluded or omitted. To illustrate, if the specification states that a complex comprises components A, B, and C (or A, B, and/or C), it is specifically intended that any of A, B or C, or a combination thereof, can be omitted and disclaimed singularly or in any combination.

Unless explicitly indicated otherwise, all specified embodiments, features, and terms intend to include both the recited embodiment, feature, or term and biological equivalents thereof.

All numerical designations, e.g., pH, temperature, time, concentration, and molecular weight, including ranges, are approximations that can be varied (+) or (−) by increments of 1.0 or 0.1, as appropriate, or alternatively by a variation of +/−15%, or alternatively 10%, or alternatively 5%, or alternatively 2%. It is to be understood, although not always explicitly stated, that all numerical designations are preceded by the term "about".

Definitions

As used in the description of the invention and the appended claims, the singular forms "a," "an" and "the" are intended to include the plural forms as well, unless the context clearly indicates otherwise.

The terms "substantially" and "about" are used herein to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. When referring to a first numerical value as "substantially" or "about" the same as a second numerical value, the terms can refer to the first numerical value being within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. The terms or "acceptable," "effective," or "sufficient" when used to describe the selection of any components, ranges, dose forms, etc. disclosed herein intend that said component, range, dose form, etc. is suitable for the disclosed purpose.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Also as used herein, "and/or" refers to and encompasses any and all possible combinations of one or more of the associated listed items, as well as the lack of combinations when interpreted in the alternative ("or").

As used herein, "optional" or "optionally" means that the subsequently described event or circumstance can or cannot occur, and that the description includes instances where the event or circumstance occurs and instances where it does not.

Preferably the ink is one that produces a low modulus article. The term "low modulus" as used herein means less than five megapascals (A/Pa). Even more preferably, the modulus is less than 2 MPa. Preferred inks include a soft hydrogel ink.

FIG. 1 is a schematic diagram of a three-dimensional (3D) printing system 2 for manufacturing a 3D article 4. The 3D printing system 2 includes a fluid tank 6, a build tray (e.g., a build tray, etc.) 8 coupled to a movement mechanism 10, a light engine 12, and a controller 14. In describing the 3D printing system 2, mutually orthogonal axes X, Y, and Z are used. Axes X and Y are lateral axes that are generally horizontal. The Z axis is generally vertical or generally aligned with a gravitational reference. When the term "generally" is used, it indicates that a direction or magnitude may not be exact but is within manufacturing tolerances. Thus, generally aligned indicates aligned to within manufacturing tolerances.

The fluid tank 6 includes upper and side walls 16 and a transparent sheet 18. In the illustrated embodiment, the transparent sheet 18 is semipermeable and can therefore transmit an inhibitor such as oxygen from below the fluid tank 6 and to within the fluid tank 6. The transparent sheet is a flexible polymer sheet and is generally transparent to ultraviolet (UV), violet, or blue light. The transparent sheet 18 may include one or more polymers such as polyvinylidene fluoride (PVDF), ethylenchlorotrifluoroethylene (ECTFE), ethyl enetetrafluoroethylene (ETFE), polytetrafluoroethylene (PTFE), perfluoroalkoxy (PFA), fluorinated ethylene propylene (FEP), polyvinylidene fluoride (PVDF) or other materials known in the art. The transparent sheet 18 can include amorphous thermoplastic fluoropolymer films such as TEFLON AF 1600™ (trademark of Chemours Company of Wilmington, DE) or TEFLON AF 2400™. Other materials are possible. In an illustrative embodiment, the transparent sheet 18 can have a thickness of about 80 microns (one thousand microns equals one millimeter) although other thicknesses are possible.

The fluid tank 6 contains a photocurable liquid ink (e.g., ink, etc.) 20. The photocurable liquid ink 20 hardens in response to exposure to ultraviolet (UV), violet, and/or blue radiation. In an illustrative embodiment, the ink 20 contains at least a photocurable liquid and a catalyst. The catalyst allows curing of the ink in response to radiation exposure. In a further illustrative embodiment, the ink contains a combination of water and a photopolymer that is miscible in the water.

In another illustrative embodiment, the ink is a hydrogel formulation that includes inter alia, water, natural or synthetic polymers, and a catalyst. The water is typically at or above 30 percent by weight. Natural polymers for hydrogel preparation can include, inter alia, hyaluronic acid, chitosan, heparin, alginate, and fibrin. Hydrogel bio-inks are known in the art for the printing of 3D articles such as soft artificial implants, contact lenses, and artificial tissue to name some examples.

In the illustrated embodiment, the build tray 8 has a downward facing lower face 22 for supporting the 3D article 4. In other embodiments, the build tray 8 can have an upward facing surface (embodiment not shown) for supporting a 3D article 4.

The movement mechanism 10 is a motorized device for vertically positioning the build tray 8 and outputting an encoder signal that is indicative of a vertical position of the build tray 8. In an illustrative embodiment, the movement mechanism 10 includes a vertically fixed portion and a vertically moving portion. The vertically moving portion supports the build tray and includes a threaded bearing. The vertically fixed portion includes a motor coupled to a lead screw which is received within the threaded bearing. As the motor rotates the lead screw, the action upon the threaded bearing translates the build tray up or down, depending upon the rotational direction of the lead screw. The encoder can be a linear or rotational encoder and outputs a signal by which the controller 14 can determine and monitor a vertical position of the build tray 8 and hence by inference the lower face 22 of the build tray 8.

Alternative embodiments of movement mechanisms 10 are possible. One alternative embodiment is a rack and pinion system. For such a system, the build tray 8 is coupled to a vertical gear (rack) with a vertical arrangement of gear teeth. A motor is coupled to a round pinion gear that engages the vertical arrangement of gear teeth. Rotation of the motor in turn translates the build tray 8 up and down. Yet another alternative is based upon a belt and pulley system. The belt is coupled to the build tray 8 and a motorized gear engages and translates the belt to vertically move the build tray 8. With any of these mechanisms, the motor can be indirectly linked via a reduction gear train for improving precision and force of movement. Various movement mechanism 10 designs are known for 3D printing.

The light engine 12 is configured to project or transmit pixelated radiation up through the transparent sheet 18. In one embodiment, the light engine 12 is a fixed projector that is based upon a radiation source, a spatial light modulator, and projection optics. Such light engines are known in the art for digital projectors that transmit visible or ultraviolet radiation for selectively curing resin for stereolithography. In a second embodiment, the light engine can include scanning light bar with a linear array of light emitting diodes. In a third embodiment, the light engine can include a laser and scanning optics. The scanning optics can include galvanometer mirrors for scanning a laser beam over the transparent sheet 18. All such light engines are known in the field of stereolithography.

The controller 14 is coupled to the movement mechanism 10, the light engine 12, and other portions of the 3D printing system 2. The controller 14 includes a processor 24 coupled to an information storage device 26. The processor 24 can otherwise be referred to as a CPU (central processing unit) and is the electronic circuitry that executes software instructions. The information storage device 26 is non-transient storage device that stores the software instructions. When executed by the processor 24, the software instructions control and monitor portions of the 3D printing system 2.

To fabricate the article 4, the controller 14 performs the following steps: (A) The movement mechanism 10 is operated to position the lower face 22 of the build tray (or later the 3D article 4) at a build plane 28 which is just above the transparent sheet 18. (B) The light engine 12 is operated to selectively irradiate the build plane 28 and to selectively harden and cure a layer of the ink 20 upon the lower face 22 of the build tray or 3D article 4. (C) Steps A and B are repeated to complete fabrication of the 3D article 4. As a note, support structures are also fabricated that provide support of the 3D article 4 to the build tray 8. As will be seen infra, steps A-C are but a subset of the steps for manufacturing article 4, which is the subject of FIG. 2.

Figure 2:
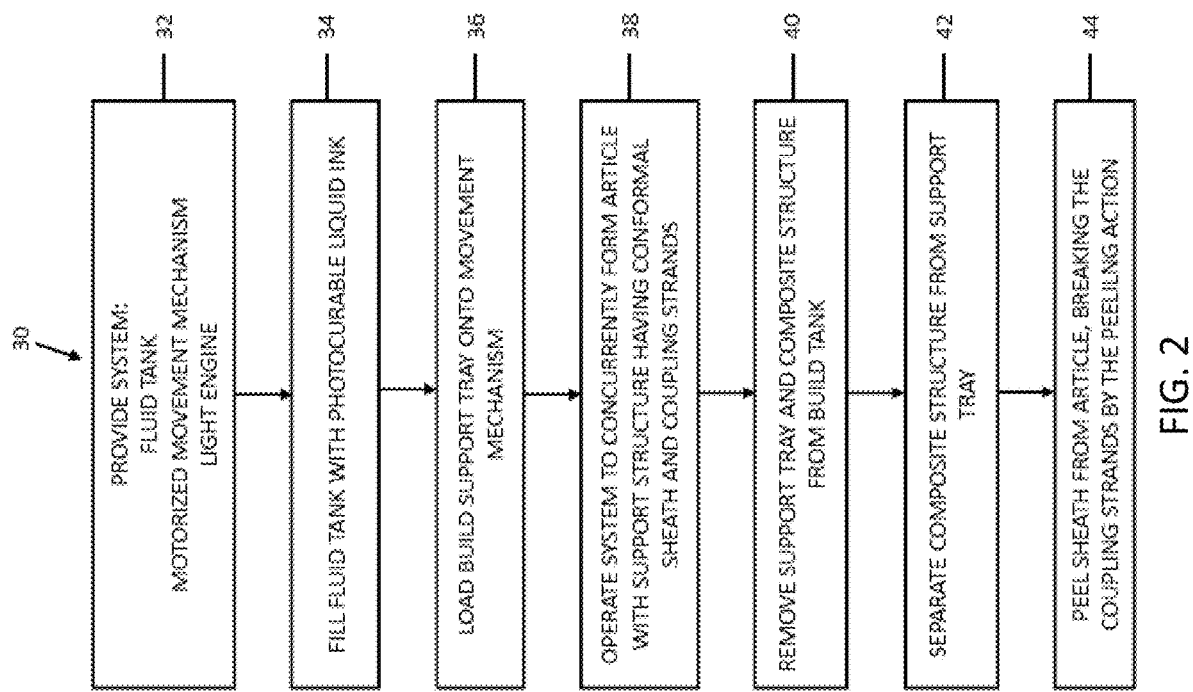
FIG. 2 is a flowchart depicting an embodiment of a method of manufacturing a 3D article.

FIG. 2 is a flowchart depicting an embodiment of a method 30 of manufacturing the 3D article 4. According to 32, 3D printing system 2 is provided including the fluid tank 6, movement mechanism 10, and light engine 12. According to 34, the fluid tank 6 is filled with photocurable liquid ink 20. In an illustrative embodiment, the ink 20 is a photocurable hydrogel composition that includes water, a natural polymer, a synthetic polymer, and a catalyst. According to 36, a support tray 8 is loaded onto the movement mechanism 10.

Figure 3:
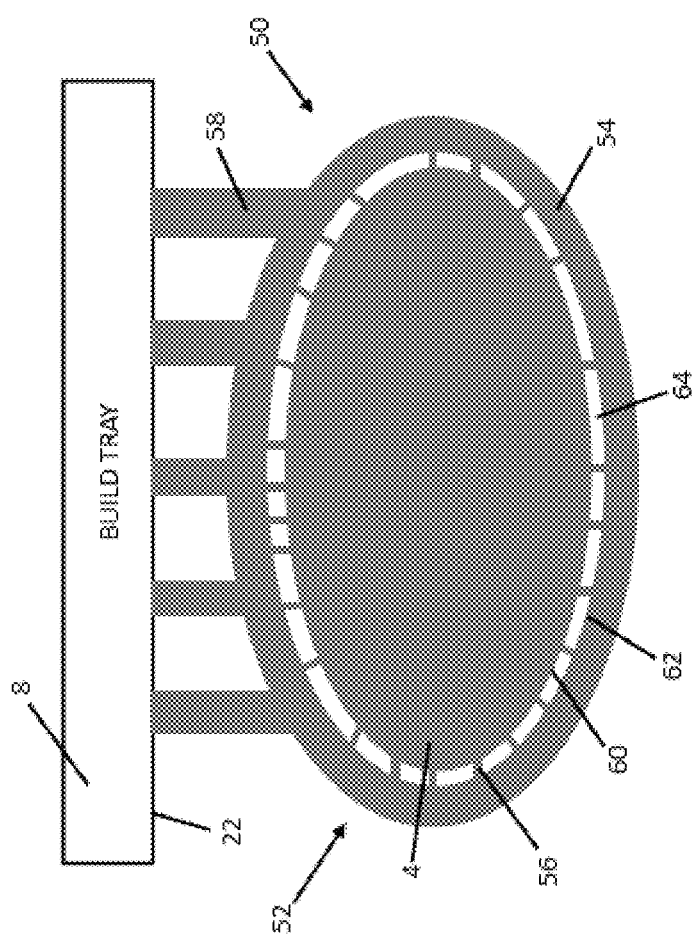
FIG. 3 is a simplified side cross-sectional illustration of a composite structure attached to a support tray. The composite structure includes a 3D article and a support structure.

According to 38, the controller 14 operates the 3D printing system to fabricate a composite structure 50 according to steps A-C discussed supra. The composite structure 50 is illustrated in FIG. 3 attached to the support tray 8. In the illustrated embodiment, the composite structure 50 includes the 3D article 4 and a support structure 52 that surrounds and supports the 3D article 4. Support structure 52 includes three types of components including a conformal sheath (e.g., sheath) 54, connecting strands 56, and support columns 58.

The 3D article 4 has an outer surface 60 which is outward facing. The conformal sheath 54 generally "follows" or conforms to the outer surface 60. The conformal sheath 54 has an inner surface 62 that is in facing relation with the outer surface 60 with a fluid filled gap 64 therebetween. The fluid filled gap 64 is filled with the photocurable liquid ink 20.

A plurality of the connecting strands 56 couple the outer surface 60 to the inner surface 62. The connecting strands 56 serve to maintain the gap 64 between the outer 60 and inner 62 surfaces. The connecting strands control and maintain a magnitude of the gap 64 measured normal to the surfaces 60 and 62. In a first illustrative embodiment, the magnitude of the gap 64 is less than two millimeters. In a second illustrative embodiment, the magnitude of the gap 64 is less than one millimeter. The connecting strands 56 individually have a thickness of less than two millimeters or less than a millimeter measured parallel to the outer 60 and inner 62 surfaces.

The support columns 58 couple the conformal sheath 54 to the lower face 22 of build tray 8. Thickness or design of support columns 58 is selected to assure a stable coupling of the sheath 54 to the build tray 8.

The composite structure 50 is generally a very low modulus material such as hydrogel. Typically the elastic modulus is less than five megapascals (MPa), less than two megapascals, or less than one megapascal. As a note: One million pascals equals one megapascal which equals one MPa.

Referring back to FIG. 2—according to step 40, the support tray 8 and composite structure 50 are removed from the fluid tank 6. According to 42, the composite structure 50 is separated from the build tray 8.

According to 44, the sheath 54 is peeled from the 3D article 4. As the sheath 54 is peeled from the article 4, the connecting strands 56 that span the gap 64 are broken. Compared to prior support methods, this removal of the support structure 52 can be performed quickly, easily, and with essentially no damage to the article 4.

In some embodiments, a post-process and/or shipment can occur between steps 42 and 44. The post-process can include one or more of cleaning, washing, surface treatment, surface coating, ultraviolet curing, and heat curing to name some examples. If shipment (transport by a carrier service including one or more of land transport, air transport, rail transport, and oceanic transport) is performed before step 44, then the support structure 52 forms part of the packaging materials to avoid damage during transport.

Figure 4:
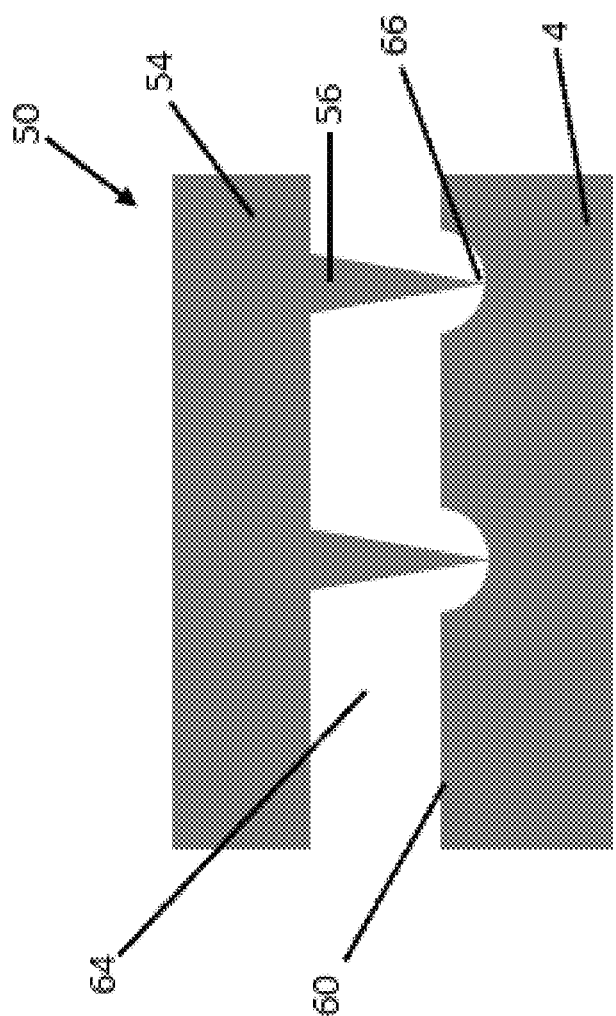
FIG. 4 is a side cross-sectional simplified illustration of a portion of a first embodiment of a composite structure.

FIG. 4 illustrates a first embodiment of a portion of the composite structure 50 with a first embodiment of connecting strands 56. The connecting strands 56 individually have a pointed or low cross sectional area tip 66 for coupling to the outer surface 60 of the 3D article 4. With this design, the tip has such a small cross sectional area that removal from the outer surface 60 requires very little force. Yet at the same time, the connecting strands 56 do provide a function of maintaining the fluid gap 64.

Figure 5:
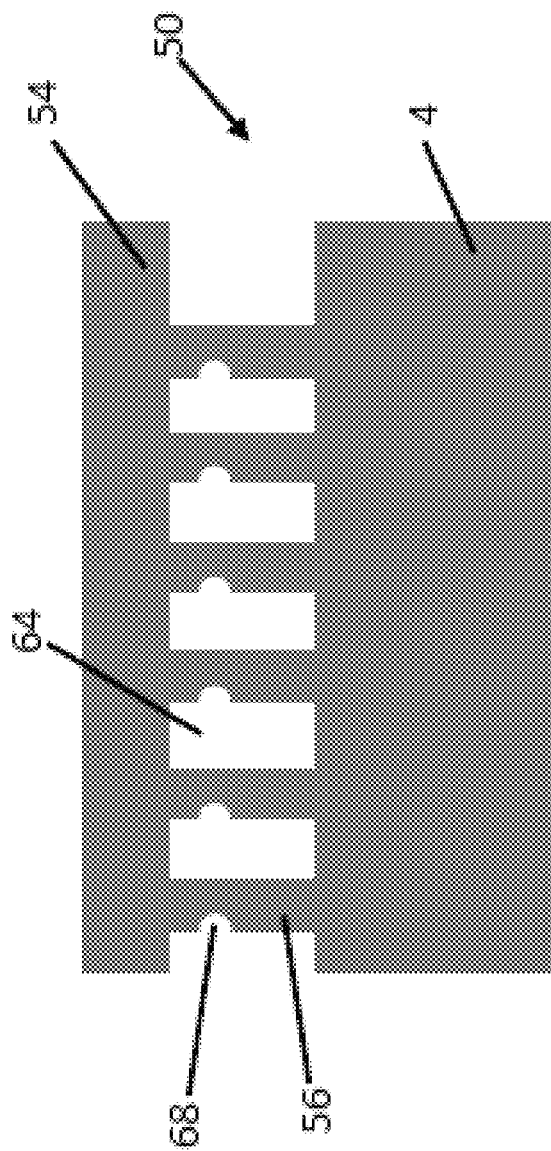
FIG. 5 is a side cross-sectional simplified illustration of a portion of a second embodiment of a composite structure.

FIG. 5 illustrates a second embodiment of a portion of the composite structure 50 with a second embodiment of connecting strands 56. The connecting strands 56 individually have a location of weakness or side notch 68. During the peeling process, the connecting strands 56 tend to break along the side notch 68.

Figure 6:
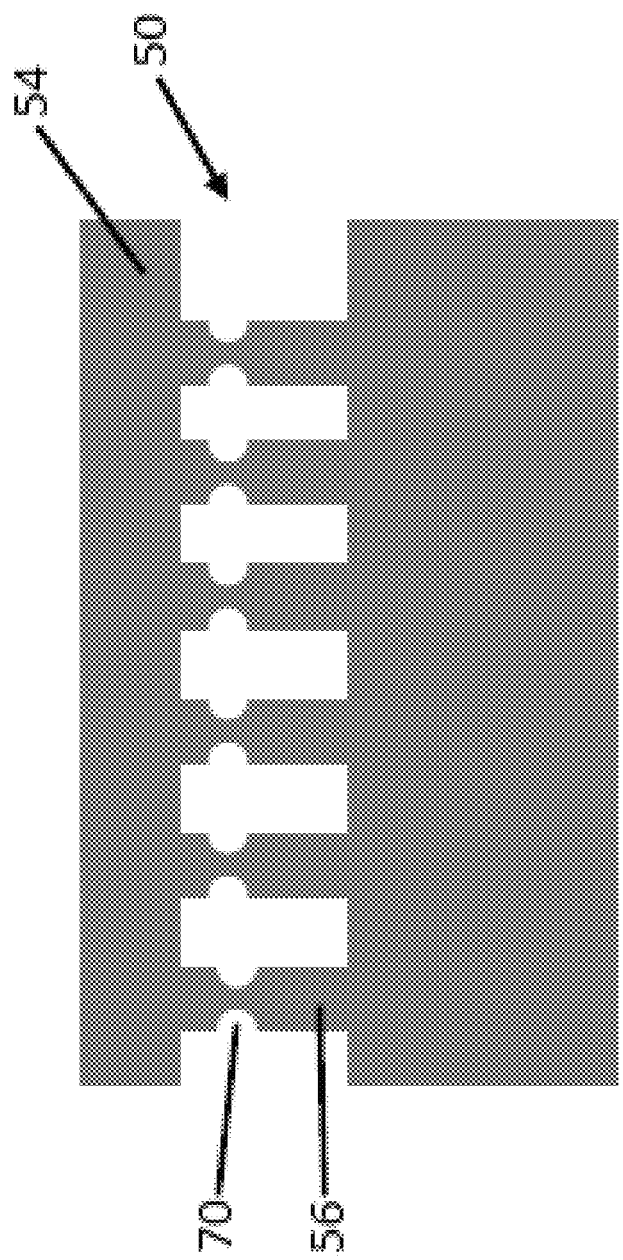
FIG. 6 is a side cross-sectional simplified illustration of a portion of a third embodiment of a composite structure.

FIG. 6 illustrates a third embodiment of a portion of the composite structure 50 with a third embodiment of connecting strands 56. The connecting strands 56 individually have a location of weakness or an annular notch 70. During the peeling process, the connecting strands 56 tend to break along the annular notch 70.

Figure 7:
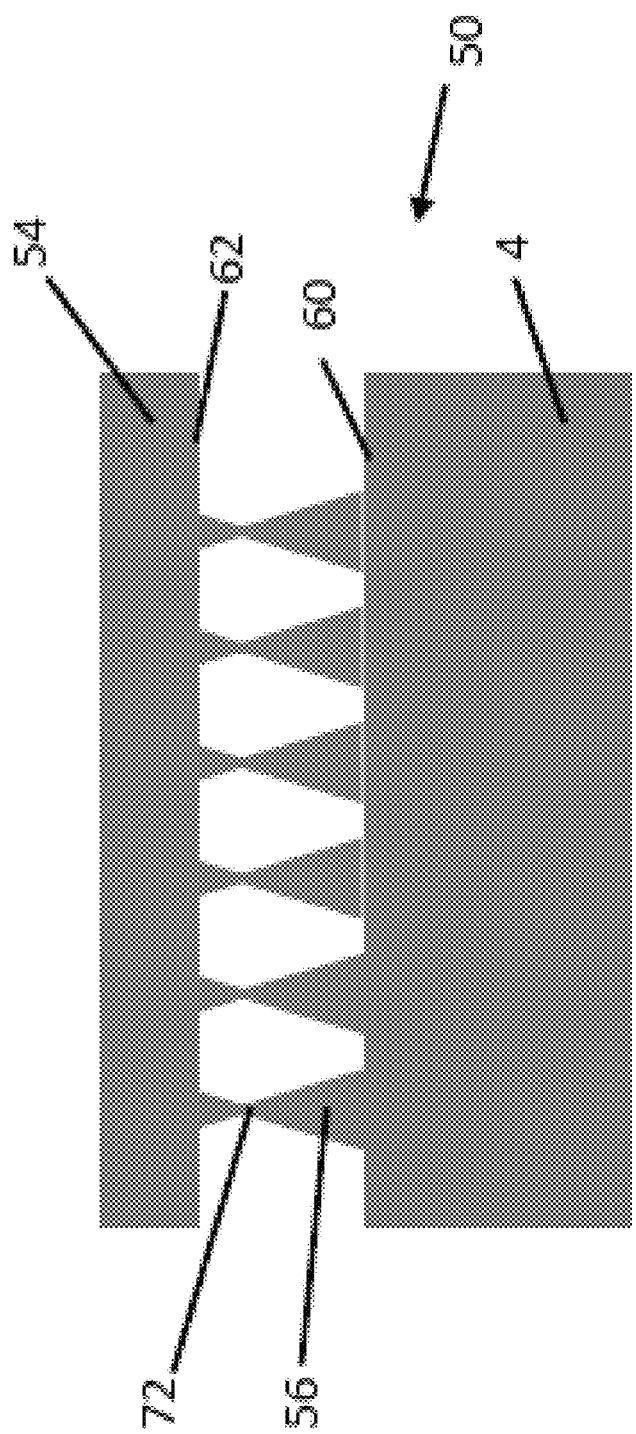
FIG. 7 is a side cross-sectional simplified illustration of a portion of a fourth embodiment of a composite structure.
Figure 8:
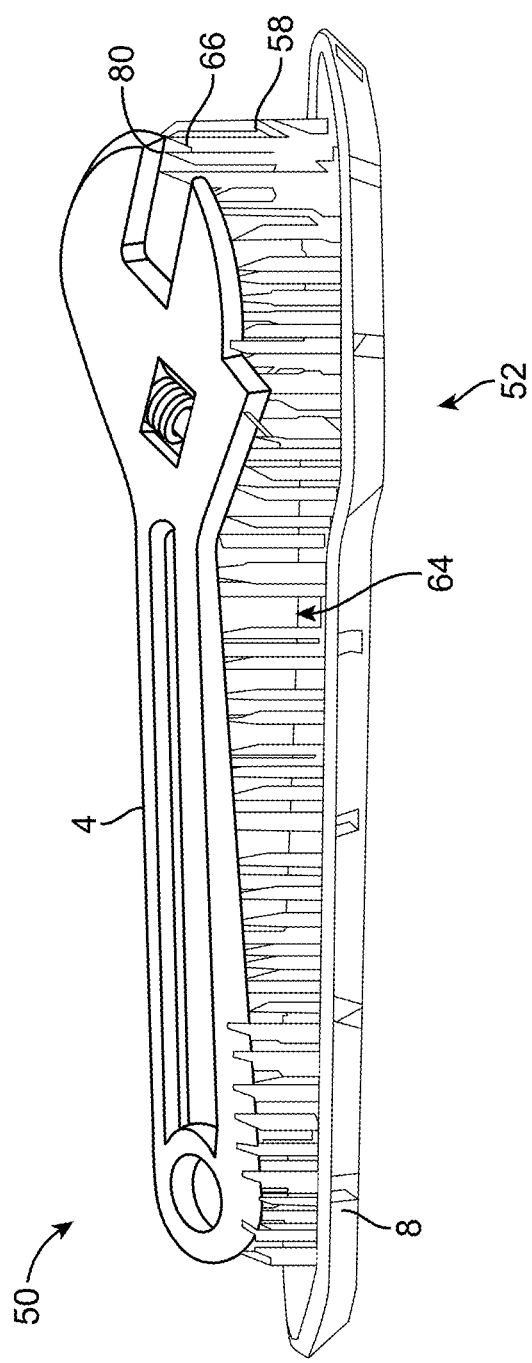
FIG. 8 is a side perspective view of a composite structure including a 3D printed article and a support structure according to one embodiment.

FIG. 7 illustrates a fourth embodiment of a portion of the composite structure 50 with a fourth embodiment of connecting strands 56. The strands have a geometry that converges or narrows away from surfaces 60 and 62 to a location of weakness 72. Other designs of connecting strands 56 are possible and may even combine more than one of the examples illustrated in FIGS. 4-7.

Now referring generally to FIGS. 8-16, is a support structure 52 and a 3D printed article 4 according to another embodiment. According to this embodiment, the build tray 8 is flat and mimics the outline of the 3D printed object 4.

According to this embodiment, the support columns 58 extend vertically upward from build tray 8 in a gyroid-like design (e.g. infinitely connected) with gaps 64. The support columns 58 are horizontally coupled such that each support column 58 is coupled to the adjacent support column 58. The gaps 64 between the support columns 58 may be diamond shaped, or other various shapes.

The support structure 52 of FIGS. 8-16 further includes the conformal sheath 54. The sheath 54 is positioned on top of the support columns 58. For example, the sheath 54 is positioned on the distal end of the support columns 58 relative to the build tray 8.

The plurality of connecting strands 56 further include a plurality of touchpoints 80. The touchpoints 80 extend through the sheath 54. The touchpoints 80 are removeably coupled to the 3D printed object 4. Placing the sheath 54 as close to the 3D printed object 4 as possible while maintaining a gap during printing will provide extra support. Uncured ink between the 3D printed article 4 and the sheath 54 leads to Stefan adhesion, which helps hold the 3D printed article 4 in place. The sheath 54 does not need to envelop the 3D printed article 4 completely, and thin cuts can be made in the support columns 58 to make removal easier as needed.

Figure 10:
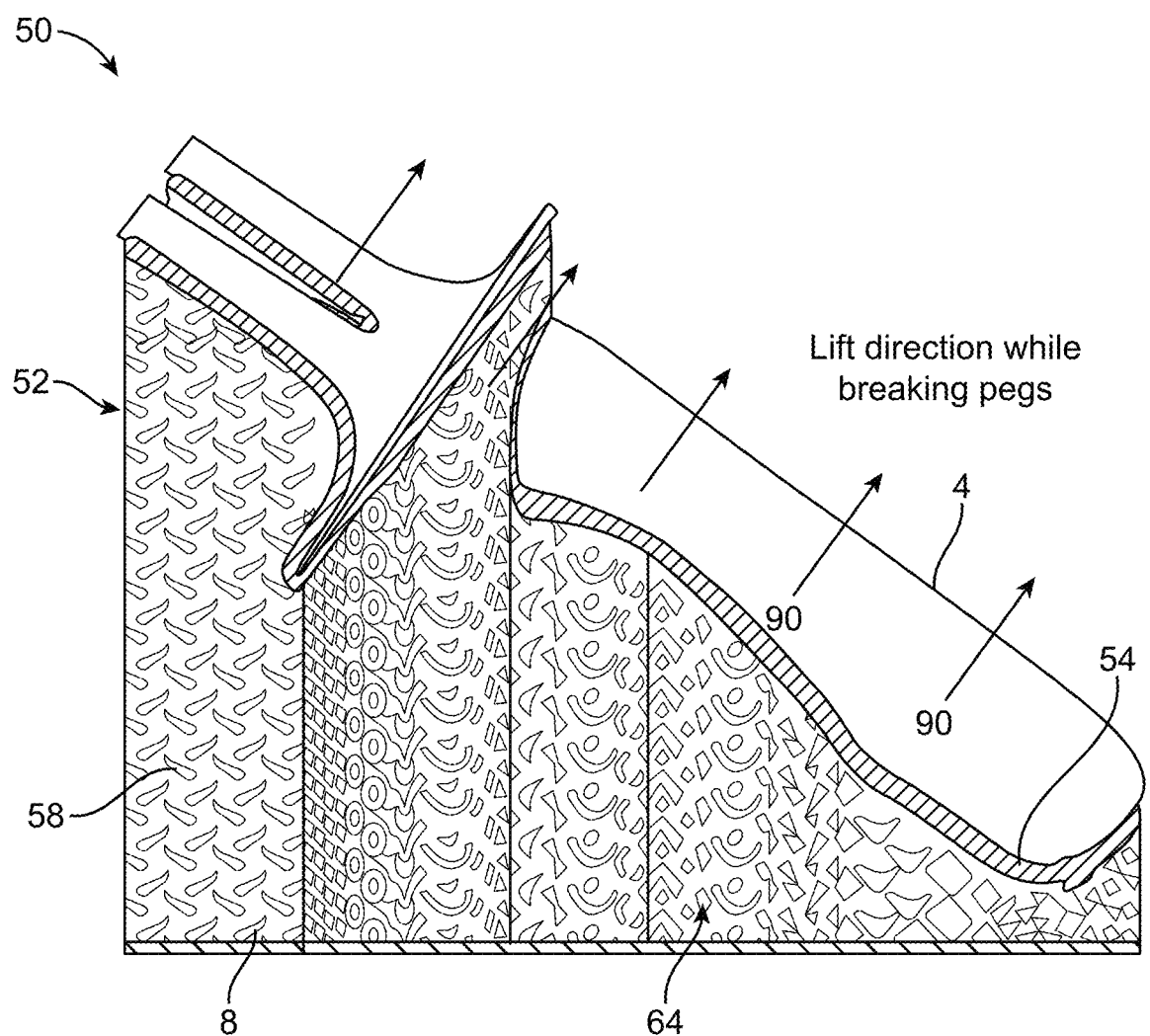
FIG. 10 is a side view of the 3D printed article and the support structure of FIG. 9.
Figure 11:
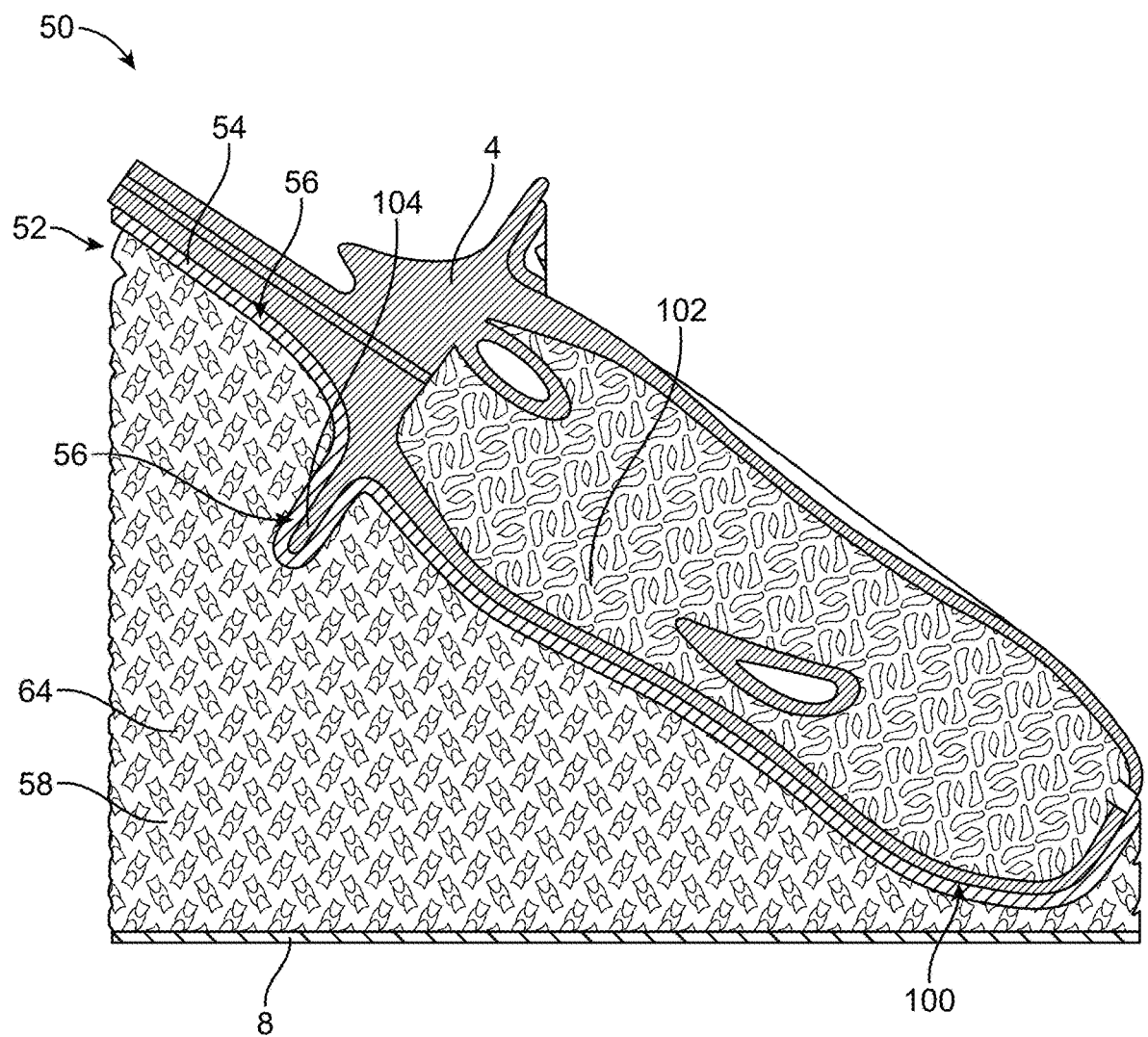
FIG. 11 is a cross sectional view of the 3D printed article and the support structure of FIG. 9.
Figure 12:
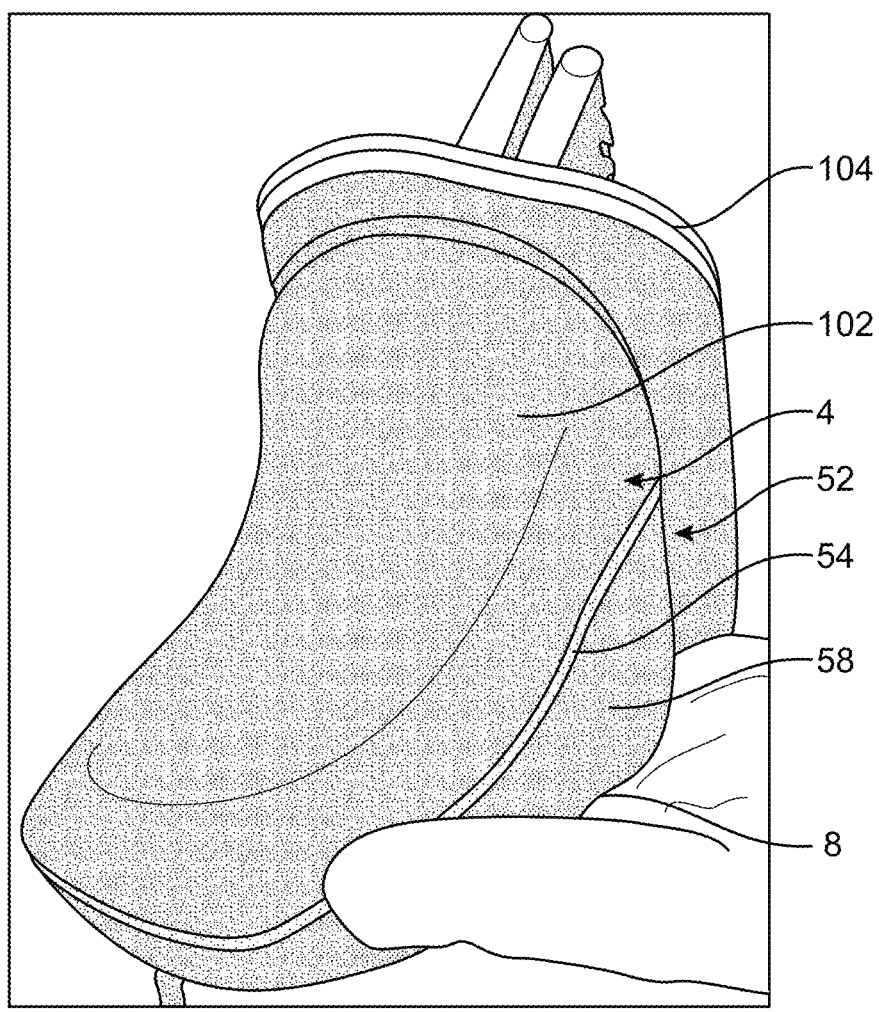
FIG. 12 is a front perspective view of a support structure according to the embodiment of FIG. 9 including cuts.

As shown in FIG. 10-12, after the printing process is completed, the 3D printed object 4 is removed from the support structure 52. The 3D printed object 4 is pulled away from the support structure 52 at an angle in a lift direction 90. During the removal process, the touchpoints 80 between the 3D printed object 4 and the support structure 52 are broken.

Figure 9:
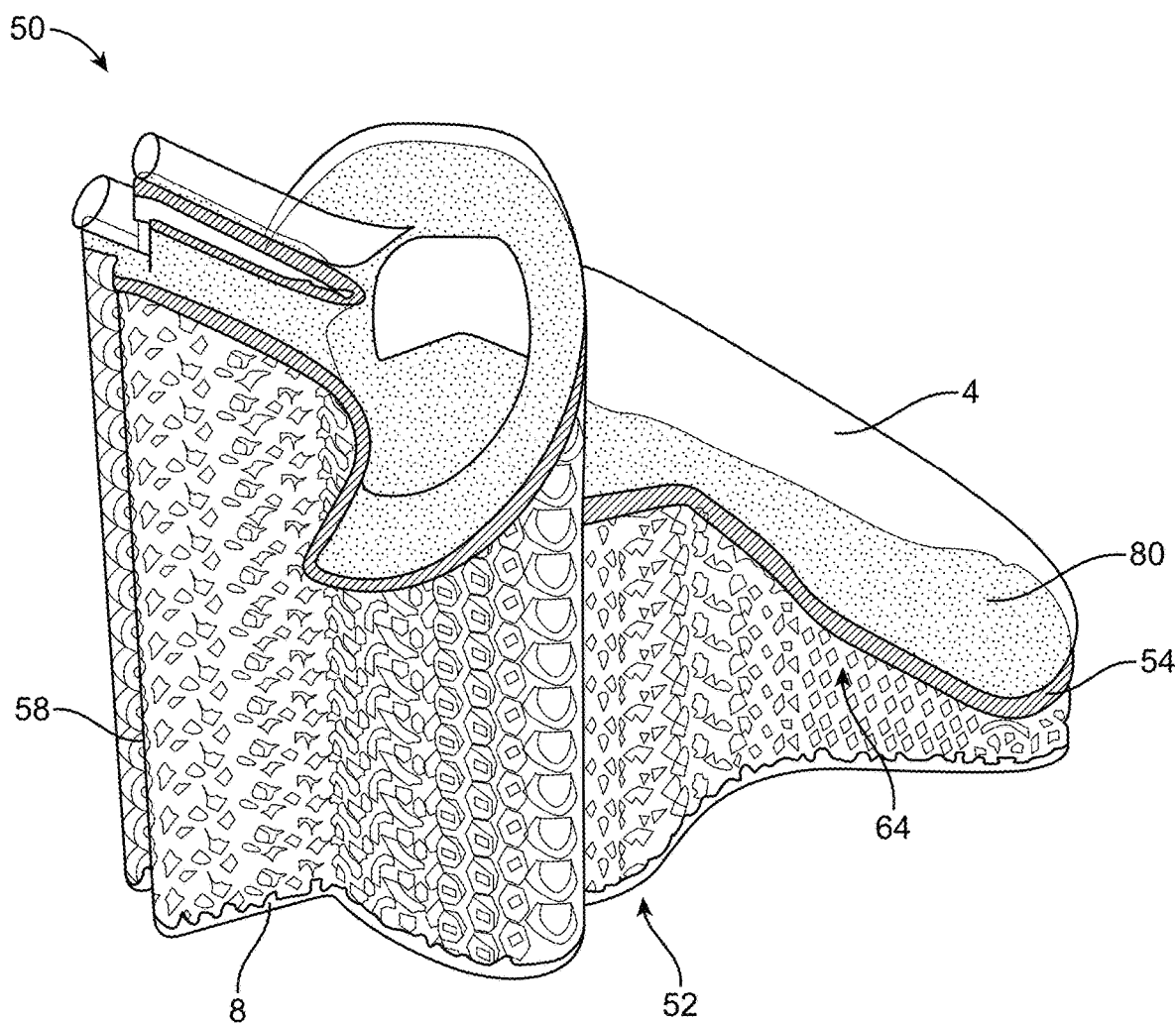
FIG. 9 is a top and side perspective view of a composite structure including a 3D printed article and a support structure according to another embodiment.

Now referring to FIG. 11, is a cross-sectional view of the embodiment of the support structure 52 and the 3D printed object 4 of FIG. 9. As shown in FIG. 11, the 3D printed object 202 is coupled to the support structure 52 by small touchpoints 80. The embodiment of the support structure 52 and the 3D printed 4 202 further includes a space 100. The space 100 is defined by the sheath 54 and a proximal side of the 3D printed object 4.

The distance between touchpoints 80 varies. For example, the 3D printed structure 4 may include a body 102 and a flange 104. The body 102 may be elongated and thicker, while the flange 104 may be thin and delicate. For example, the flange 104 may have more touchpoints 80 than the body 102. Furthermore, the flange 104 may be coupled to more touchpoints 80 that are closer to each other. Instead, the body 102 may have less touchpoints 80 that are further spread apart. The flange 104 may require more touchpoints 80 because the flange 104 is a more delicate structure that may lack its own structural support prior to curing.

Figure 13:
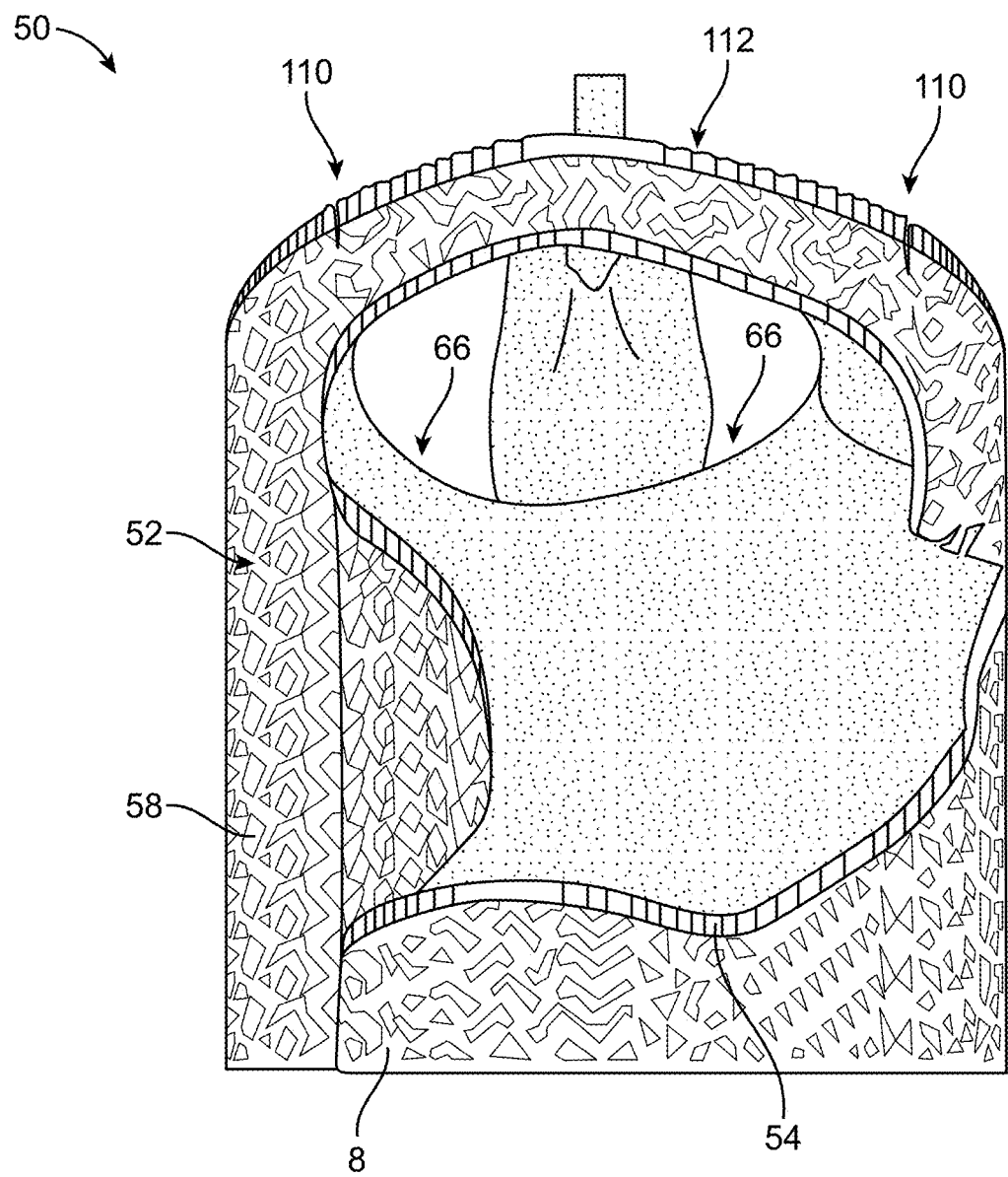
FIG. 13 is a top and side perspective view of the support structure according to the embodiment of FIG. 12.
Figure 14:
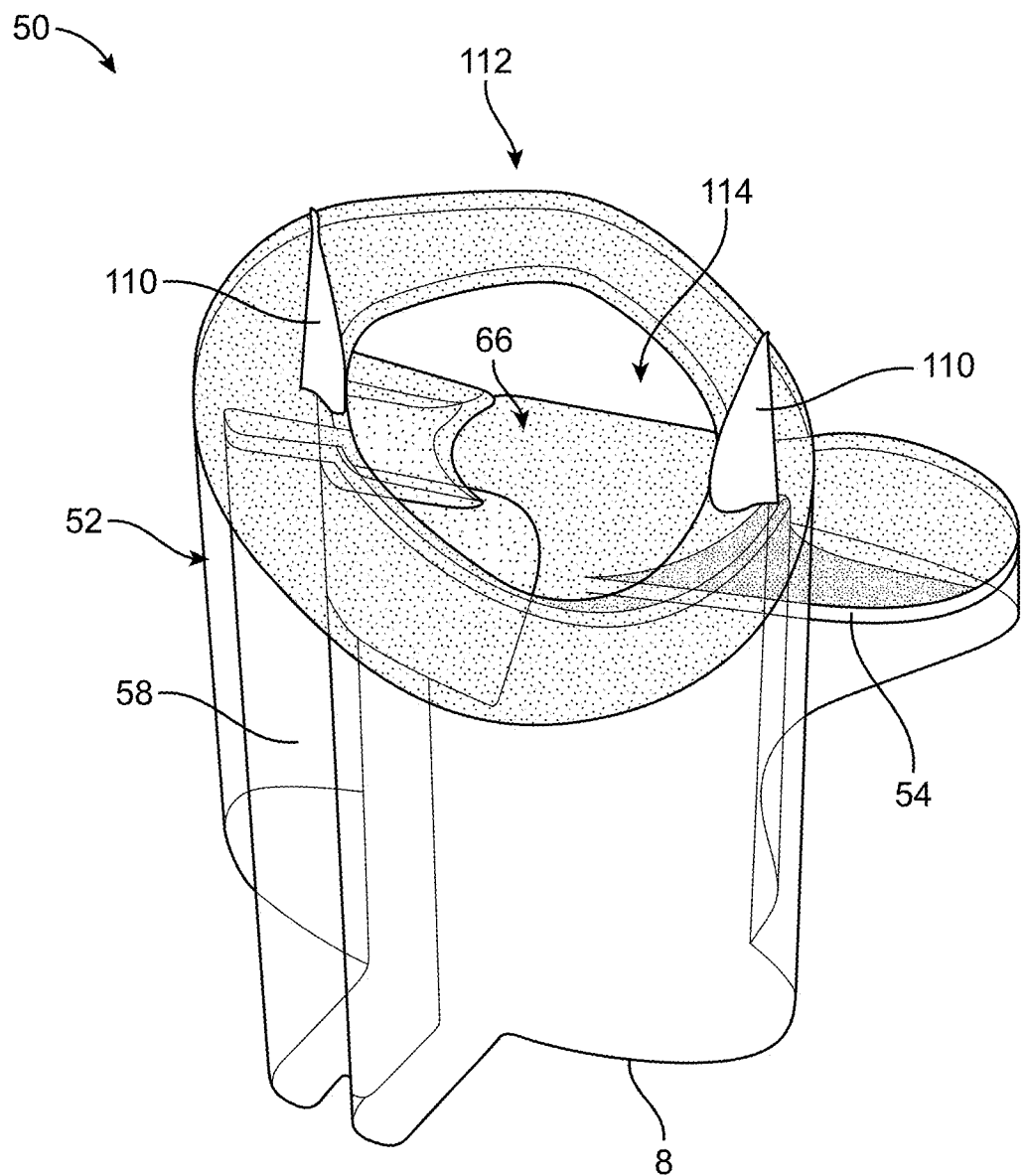
FIG. 14 is a perspective view of the composite structure including a 3D printed article and the support structure according to the embodiment of FIG. 12.

Now referring to FIG. 13-14 is a front and back perspective view, respectively, of the support structure 52 and the 3D printed object 4. The support structure 52 may further includes a plurality of slits 110. According to this embodiment, the support structure 52 surrounds the 3D printed object 4. For example, the support structure 52 may support a portion of the 3D printed object 4 from below the 3D printed object 4 and from above. For example, this may be advantageous in supporting 3D printed objects 4 that have a hollow inner cavity.

According to this embodiment, the support structure 52200 includes an arched portion 112 that defines an inner cavity 114 for the 3D printed object 4. The plurality of slits 110 are positioned on the arched portion 112. For example the plurality of slits 110 may be a point of fracture for the support structure 52 during removal of the 3D object 4. For example, when removing the 3D printed object 4, the plurality of slits 110 may completely fracture the support structure 52 when the user peels the 3D printed object 4 from the support structure 52.

Figure 15:
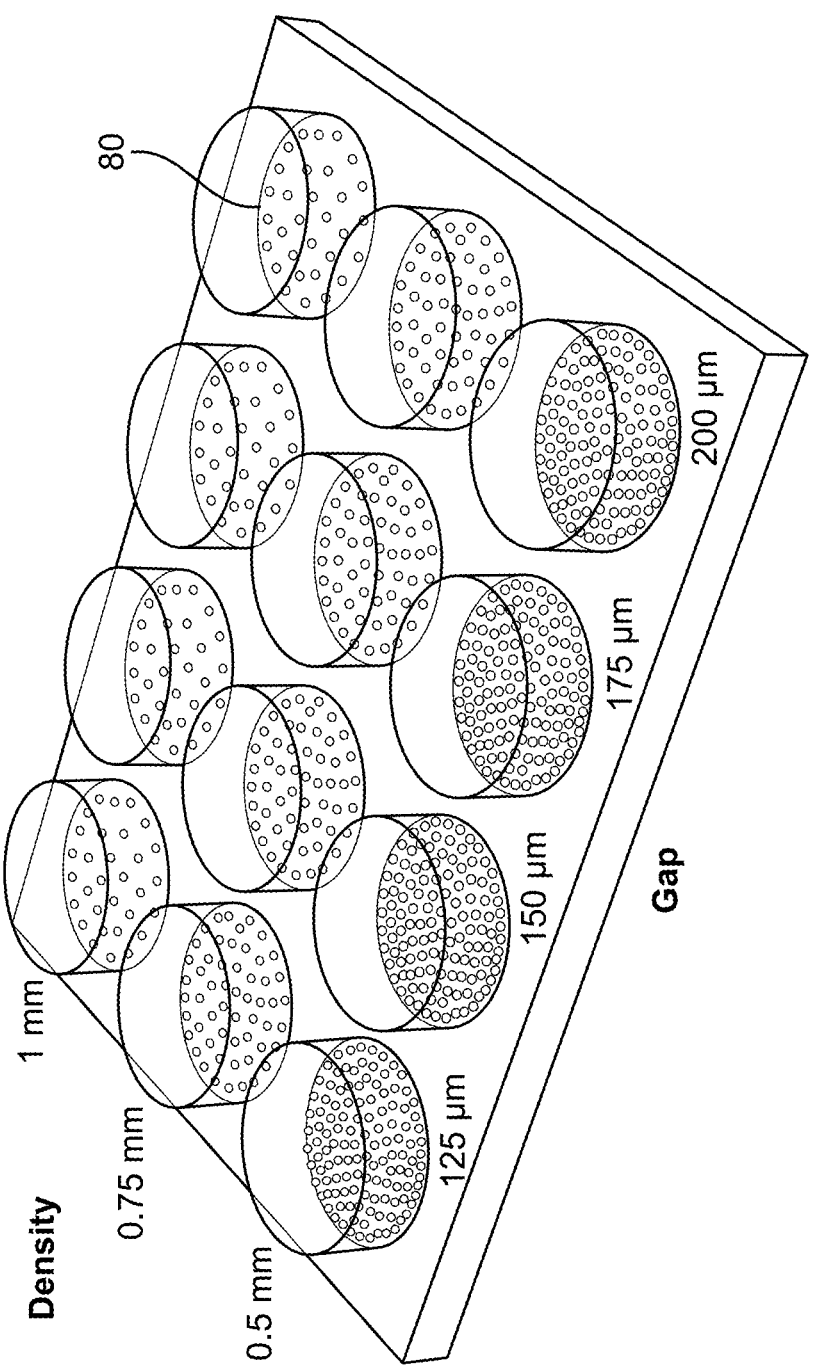
FIG. 15 is a schematic diagram of various densities and gap distances of support structures for 3D printing an article according to one embodiment.

FIG. 15 is a schematic illustrating the difference in gap size and density of touchpoints 80. The difference in gap size and density of touchpoints 80 may vary based on the shape of the object being printed. Furthermore, varying the gap size and density of touchpoints 80 may make the removal of the 3D printed 4 object easier while still supporting the 3D printed object 4 during printing.

Figure 16:
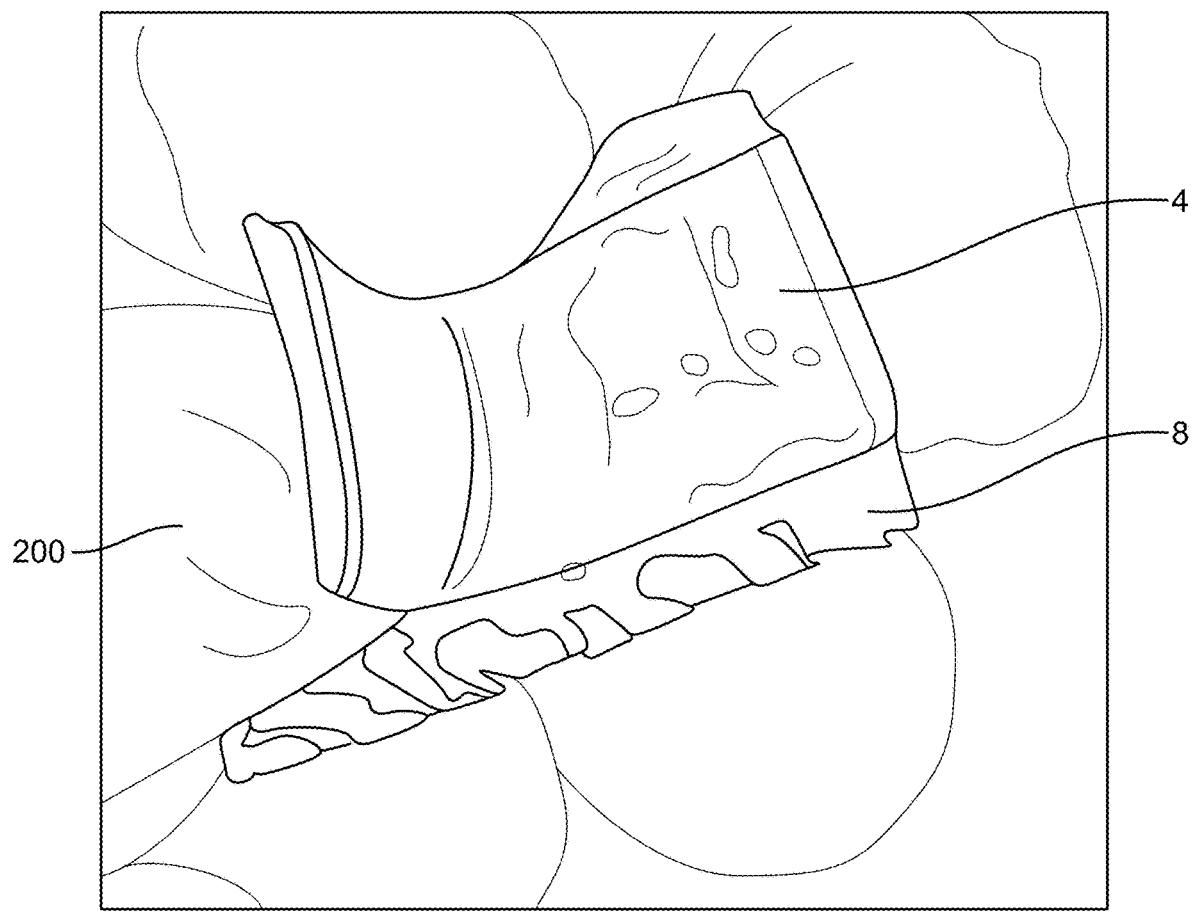
FIG. 16 is a top down perspective view of a removal of a 3D printed article from a support structure.

Now referring to FIG. 16 is a perspective view of a user 20 removing the 3D printed object 4 from the support structure 52. As shown in FIG. 16, the user 200 may use their finger (e.g. a thumb) to separate the 3D printed object 4 from the support structure 52. For example, the user 200 may wedge their finger between the support structure 52 and the 3D printed object 4 and then peel the 3D printed object 4 away from the support structure 52 breaking any touchpoints 80.

The specific embodiments and applications thereof described above are for illustrative purposes only and do not preclude modifications and variations encompassed by the scope of the following claims.

These examples are provided for illustrative purposes only and not to limit the scope of the claims provided herein.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof, inclusive of the endpoints. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed:

1. A method of manufacturing a three-dimensional (3D) article having an outer surface using a print engine having a fluid tank, a moveable build surface coupled to a movement mechanism, and a light engine comprising:
    filling the fluid tank with a photocurable liquid ink;
    positioning the moveable build surface within the photocurable ink proximate to a build plane;
    operating the movement mechanism and the light engine to fabricate a composite structure including the 3D article coupled to a support structure, the support structure including:
        a conformal sheath having an inside surface that follows the outer surface of the 3D article with a gap between the inside surface of the sheath and the outer surface of the article; and
        a plurality of strands that span the gap and individually have opposed ends that are coupled to the inside surface of the sheath and the outer surface of the article to maintain the gap, the gap filled with the photocurable liquid ink;
    removing the composite structure from the fluid tank; and
    removing the sheath from the 3D article including peeling the inside surface of the sheath away from the outer surface of the article, wherein the peeling progressively breaks the plurality of strands.

2. The method of claim 1 wherein the photocurable liquid ink is hydrogel bioink that contains water, photopolymer, and a catalyst.

3. The method of claim 1 wherein operating the light engine includes curing the photocurable liquid ink in a layer-by-layer manner.

4. The method of claim 1 wherein the photocurable liquid ink is at least 30 percent water by weight.

5. The method of claim 1 wherein the formed composite structure has an elastic modulus of less than five million pascals (five MPa).

6. The method of claim 1 wherein the formed composite structure has an elastic modulus of less than two million pascals (two MPa).

7. The method of claim 1 wherein the formed composite structure has an elastic modulus of less than one million pascals (one MPa).

8. The method of claim 1 wherein the formed composite structure has an elastic modulus within a range of 50 to 500 thousand pascals (50-500 KPa).

9. The method of claim 1 wherein the article is one of a contact lens, an artificial bodily tissue construct, and a soft implant.

10. The method of claim 1 wherein the gap has a thickness of less than two millimeters (mm).

11. The method of claim 1 wherein the gap has a thickness of less than one millimeter (mm).

12. The method of claim 1 wherein the plurality of strands includes at least 25 strands.

13. The method of claim 1 wherein the plurality of strands includes at least 50 strands.

14. The method of claim 1 wherein the plurality of strands includes at least 100 strands.

15. The method of claim 1 wherein the plurality of strands individually have a thickness of less than one millimeter.

16. The method of claim 1 wherein the plurality of strands individually include a location of weakness within the gap at which they preferentially break when peeling the inside surface of the sheath away from the outer surface of the article.

17. The method of claim 1 further comprising post-processing the composite structure before removing the sheath from the 3D article, post-processing includes one or more of cleaning, curing, coating, and treating the 3D article.

18. A method of manufacturing a three-dimensional (3D) article having an outer surface using a print engine having a fluid tank, a moveable build surface coupled to a movement mechanism, and a light engine comprising:
    filling the fluid tank with a photocurable liquid ink;
    positioning the moveable build surface within the photocurable ink proximate to a build plane;
    operating the movement mechanism and the light engine to fabricate a composite structure including the 3D article coupled to a support structure, the support structure including:
        a conformal sheath having an inside surface that follows the outer surface of the 3D article with a gap of less than 2 millimeters between the inside surface of the sheath and the outer surface of the article; and
        a plurality of at least 25 strands that span the gap and individually have opposed ends that are coupled to the inside surface of the sheath and the outer surface of the article to maintain the gap, the gap filled with the photocurable liquid ink;
    removing the composite structure from the fluid tank; and
    peeling the inside surface of the sheath away from the outer surface of the article, wherein peeling progressively breaks the plurality of strands.

19. A method of manufacturing a three-dimensional (3D) article having an outer surface using a print engine having a fluid tank, a moveable build surface coupled to a movement mechanism, and a light engine comprising:
    filling the fluid tank with a photocurable liquid ink;
    positioning the moveable build surface within the photocurable ink proximate to a build plane;
    operating the movement mechanism and the light engine to fabricate a composite structure including the 3D article coupled to a support structure, the 3D article and the support structure having an elastic modulus of less than five million pascals, the support structure including:
        a conformal sheath having an inside surface that follows the outer surface of the 3D article with a gap of less than 2 millimeters between the inside surface of the sheath and the outer surface of the article; and
        a plurality of at least 25 strands that span the gap and individually have opposed ends that are coupled to the inside surface of the sheath and the outer surface of the article to maintain the gap, the gap filled with the photocurable liquid ink;
    removing the composite structure from the fluid tank; and
    peeling the inside surface of the sheath away from the outer surface of the article, wherein peeling progressively breaks the plurality of strands.

20. The method of claim 19, wherein the support structure includes a plurality of support columns.

21. The method of claim 20, wherein the plurality of support columns are a gyroid-like structure.

22. The method of claim 19, wherein the support structure further comprises a plurality of slits, wherein the plurality of slits weaken the support structure during removal of the 3D printed article such that the support structure fractures.

23. The method of claim 19, wherein the support structure further includes a plurality of connecting strands, the plurality of connecting strands comprising a plurality of touchpoints.

24. The method of claim 22, wherein the size and density of the plurality of touchpoints is adjusted based on the composition of the photocurable ink and the 3D article being printed.

* * * * *